Figure 1:
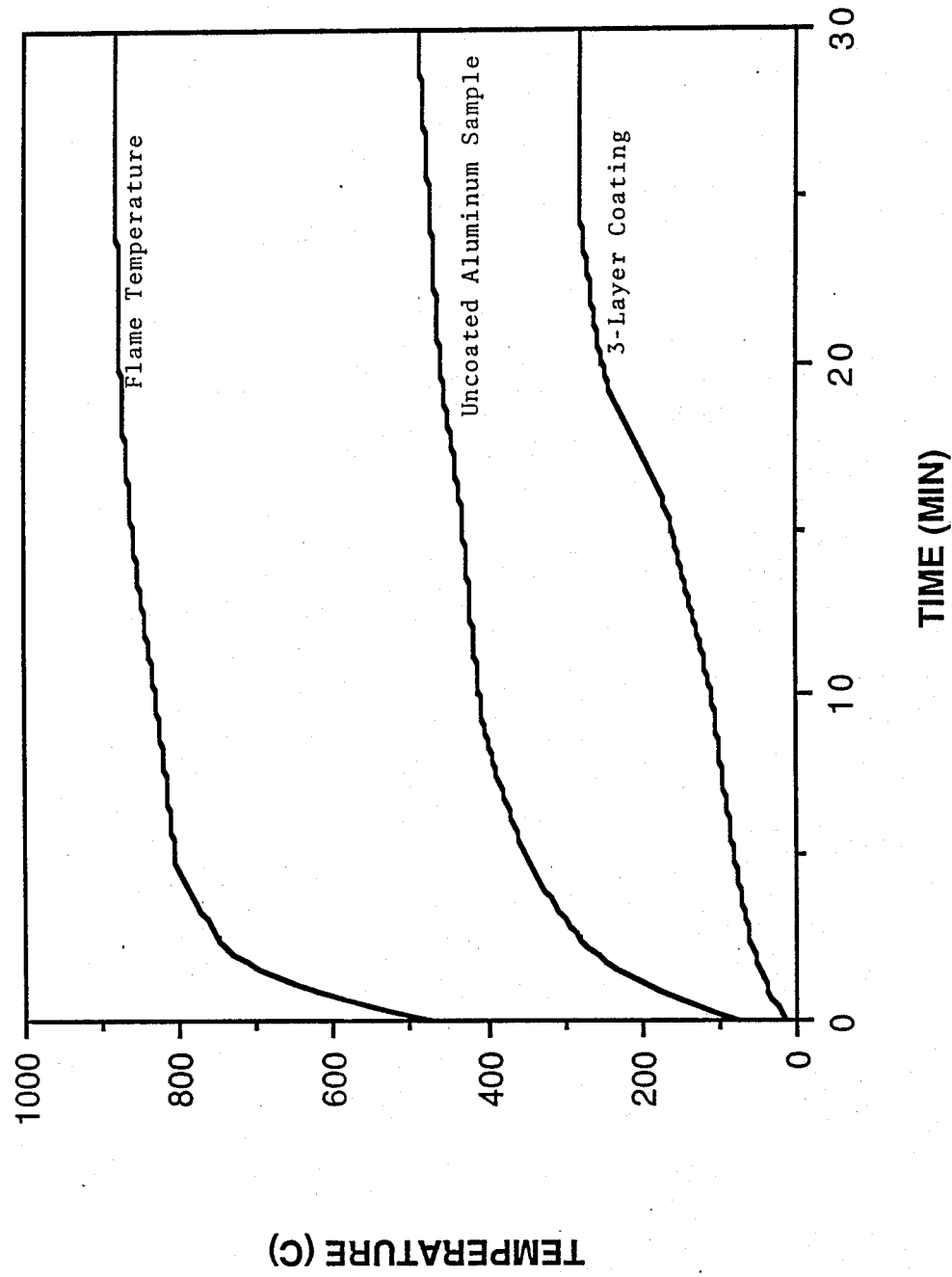

United States Patent [19]

Nguyen et al.

[11] Patent Number: 4,888,057
[45] Date of Patent: Dec. 19, 1989

[54] INORGANIC INTUMESCENT FIRE PROTECTIVE COATINGS

[75] Inventors: Dat T. Nguyen, Mississauga; Dwight E. Veinot, Halifax; James Foster, Mississauga, all of Canada

[73] Assignee: Her Majesty the Queen as represented by the Minister of National Defence of Her Majesty's Canadian Government, Canada

[21] Appl. No.: 213,116

[22] Filed: Jun. 29, 1988

[51] Int. Cl.4 .............................................. C09D 5/18
[52] U.S. Cl. .................................. 106/18.12; 106/74; 106/84; 106/482; 252/606; 428/921
[58] Field of Search ................ 106/18.12, 74, 84, 482; 252/606; 428/921

[56] References Cited

U.S. PATENT DOCUMENTS

| | | | |
|---|---|---|---|
| 3,865,760 | 2/1975 | Pitts et al. | 106/18.12 |
| 4,095,985 | 6/1978 | Brown | 106/84 |
| 4,312,673 | 1/1982 | Neely, Jr. | 106/74 |
| 4,338,374 | 7/1982 | Neser | 106/74 |
| 4,412,863 | 11/1983 | Neely, Jr. | 106/84 |
| 4,521,333 | 6/1985 | Grahan et al. | 106/18.12 |

*Primary Examiner*—Paul Lieberman
*Assistant Examiner*—Helene Klemanski
*Attorney, Agent, or Firm*—Nixon & Vanderhye P.C.

[57] ABSTRACT

The invention disclosed is a fire resistant inorganic coating composition which intumesces when subject to high temperatures to form a substantially continuous heat insulating structure and retains this structure for prolonged periods at temperatures up to 1000° C. The coating composition comprises

| | Parts by Weight |
|---|---|
| sodium silicate (aqueous solution) | 40-70 |
| potassium silicate (aqueous solution) | 40-70 |
| silicon carbide powder | 3-15 |

A composite fire-protective coating system is also disclosed which comprises a plurality of coatings sequentially applied to the substrate, typically aluminum, to be protected. Specifically, a first heat resistant, substantially air impermeable bonding layer and an inorganic intumescent layer as described above. An additional heat resistant air impermeable layer may be included as a top coat. Some applications may require an additional inorganic intumescent layer.

28 Claims, 2 Drawing Sheets

INORGANIC INTUMESCENT FIRE PROTECTIVE COATINGS

This invention relates to fire resistant coating compositions, and in particular, to inorganic intumescent coating compositions for the fire protection of flammable substrates, particularly metal substrates such as aluminum.

One of the most common materials used in the construction of modern ships is architectural aluminum. Since aluminum and its alloys substantially lose their mechanical strength at high temperatures (aluminum alloys generally soften at about 400° C. and melt at about 600° C.), a fire protection system is needed to protect the metal from direct exposure to flames.

Intumescence is the ability of the coating, upon exposure to high temperature flame, to swell or foam into a solid heat insulating layer while protecting the substrate from direct exposure to the flame.

Commercial intumescent fire retardent paints have been widely developed. These coatings have been used to protect walls and ceiling of hospitals, nursing homes, schools, ships and military buildings and equipment. The objective of fire protection is accomplished in one or more of the following ways:

(1) providing a non-combustible layer over metal or flammable substrates;
(2) liberating inhibiting gases;
(3) absorbing heat on decompositions;
(4) liberating water when heated; and
(5) intumescing upon heating.

However, these materials are typically organic-based and have several disadvantages. Firstly, organic additives undergo exothermic decomposition which reduces the thermal insulative value of the system. Secondly, the resulting carbonaceous char has low structural integrity and cannot withstand the mechanical stress induced by a fire. Thirdly, the coating releases organic gases which are undesirable in a closed fire environment.

According to the invention, a fire resistant, inorganic intumescent coating composition which intumesces when subjected to high temperatures, is provided, comprising

|  | Parts by Weight |
| --- | --- |
| sodium silicate (aqueous solution) | 40–70 |
| potassium silicate (aqueous solution) | 40–70 |
| silicon carbide powder | 3–15 | wherein the amounts of the ingredients are expressed as parts by weight, based upon the weight of the composition.

The silicon carbide powder is preferably of a particle size 50–200 micrometers. Silicon carbide also has a high thermal emittance which results in radiation of most of the incoming heat at higher wave lengths, thus reducing the temperature of the back surface of the substrate.

Preferably, the composition further comprises silicon carbide whiskers (short fibers—size range 50–200 micrometers) in an amount of 1–8 parts by weight of the composition. The silicon carbide whiskers/fibers improve the high temperature stability and structural integrity of the resulting foamed structure. Other fibers may also be employed, such as alumina whisker, wollastonite or silica fiber.

Small amounts of borax may be included to improve the adhesion of the foamed structure to the substrate, e.g. 2–4 parts by weight.

The coating retains its expanded/foamed structure at high temperatures to provide a heat insulative layer which protects the substrate for a prolonged period.

According to another embodiment of the invention, a composite fire resistant coating system for fire protection of a substrate is provided, comprising a plurality of coating compositions sequentially applied to the substrate and cured in situ in the following order, (a) a heat resistant substantially air impermeable bonding layer, and
(b) an inorganic intumescent layer which intumesces when subjected to high temperatures.

Preferably, the composite further comprises (c) an outer heat resistant layer. This layer may have the same composition as that of layer (a).

Optionally, a second inorganic intumescent layer (d) may be included on top of layer (c). This layer may be of the same composition as layer (b).

Sodium and potassium silicates serve as the binder in each layer.

The substrate to be fire protected is typically a metal such as aluminum.

The fire resistant inorganic intumescent coating composition or layer of the composite coating system, as the case may be, intumesces or foams upon heating to temperatures of about 130° C. and retains its intumesced structure for prolonged periods at temperatures up to 1000° C. Intumescence apparently occurs as a result of the rapid water evaporation in the silicate.

In the case of the composite coating system, the silicon carbide whiskers/fibers may be located either in the intumescent layer or in the heat resistant top coat, if present.

Vermiculite may be added between layers (a) and (b) or in the intumescent layer (b), as filler to improve the refractory characteristic of the foamed structure.

The heat resistant bonding layer serves two important purposes. Firstly, it acts as a thin high heat resistant layer which shields the substrate from exposure to the oxygen in air. Secondly, it provides a bonding mechanism between the aluminum substrate and the intumescent coating. Hence, this layer should have several properties such as refractory characteristics, good bonding strength to the substrate, e.g. aluminum, and chemical compatibility with the intumescent layer. Specifically, the layer comprises

|  | Parts by Weight |
| --- | --- |
| sodium silicate (aqueous solution) | 40–60 |
| potassium silicate (aqueous solution) | 40–60 |
| refractory filler | 10–30 | wherein the amounts of ingredients are specified as parts by weight, based upon the weight of the composition. Sodium and potassium silicates act as the binder for the composition. The preferred amount of both sodium and potassium silicates is about 50 parts by weight. The refractory filler may be silica, borax, aluminum trioxide, alumina or aluminum trihydrate. Improved adhesion may be achieved by including about 2–4 parts by weight of borax in the coating composition. The preferred refractory filler is aluminum trihydrate in an amount of about 20 parts by weight.

The outer heat resistant layer acts as a physical barrier which protects the foamed structure. The composition of the outer layer is typically the same as that of the bonding layer desribed above.

Figure 2:
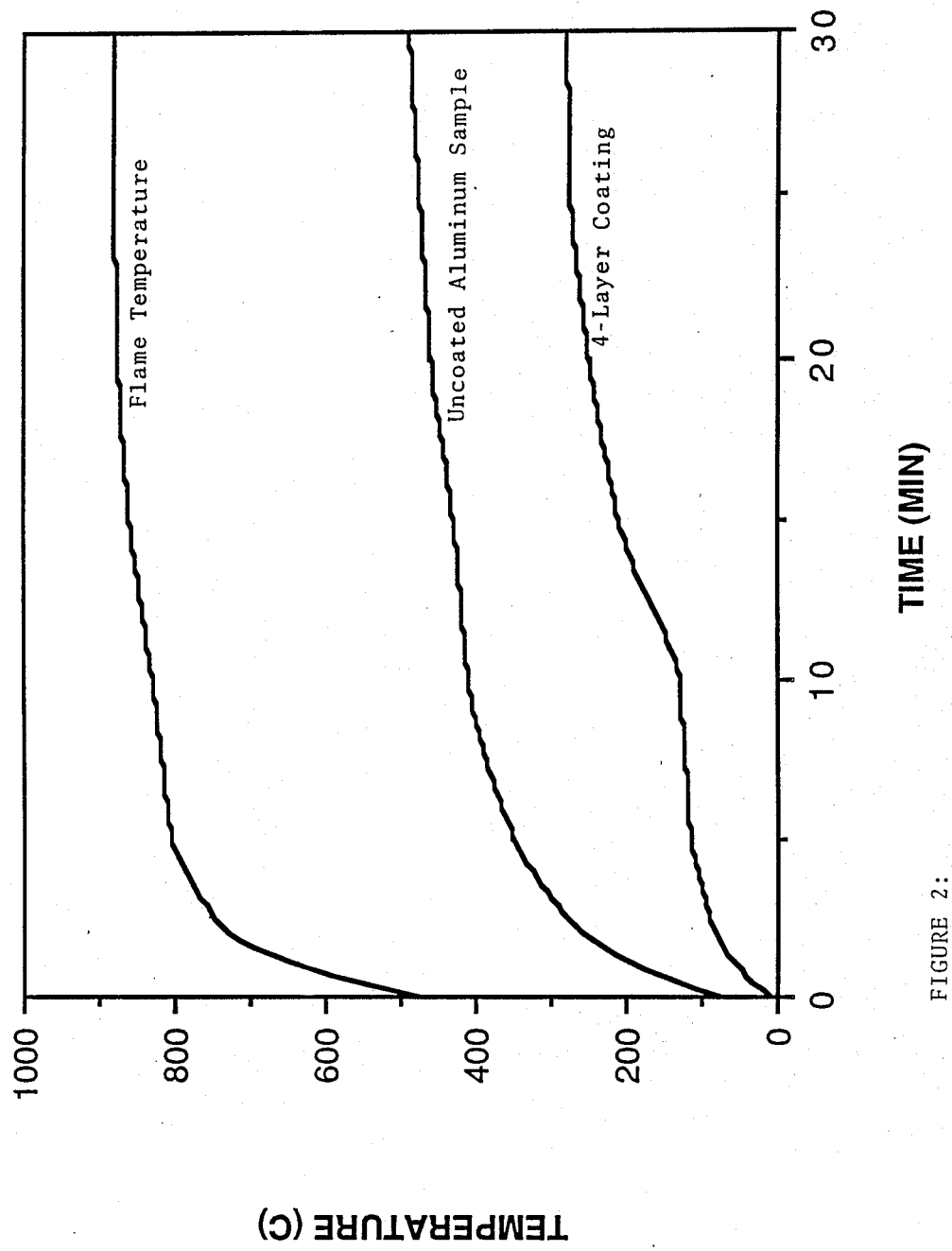

In the drawing which illustrates the embodiments of the invention,

The FIGS. 1 and 2 are time-temperature profiles which compare the performance of coating systems according to the invention.

LABORATORY FLAME TEST

Based on the time-temperature profile specified in the ASTM E119, a laboratory flame test unit was designed to evaluate fire-protective performance of the coatings. This flame test unit consists of a Bunsen burner and a mixing chamber. The gas is directed into the mixing chamber at a constant flow rate. The mixing chamber is basically a mullite tube 3 inches in diameter and 12 inches in length; it provides a heat source of up to 900° C. The sample and sample holder are located at the top of the mixing chamber unit. Temperatures at about two inches in front of the sample's surface and at the back of the substrate are monitored and recorded as flame and sample temperatures, respectively.

SAMPLE PREPARATION

Coatings were applied onto aluminum substrates (3"×3"×1/16") using standard paint brushes and dried overnight in air at room temperature. For composite coatings, the additional coats were applied after drying of the previous coating in air for about 2 to 3 hours. The coating thickness was measured using a micrometer.

The sodium and potassium silicate solutions were supplied by National Silicates, New York, under the name sodium silicate N ® and Kasil ®6 respectively.

MULTILAYER COMPOSITE COATING

The coating systems which provide sufficient fire protection are generally described as follows:
(1) 3 layers:
  (a) Bond Coat
  (b) Intumescent Coat
  (c) Top Coat
(2) 4 layers:
  (a) Bond coat
  (b) Intumescent Coat
  (c) Top Coat
  (d) Additional Intumescent Coat The fire test results of Examples 1 and 2 are plotted in FIGS. 1 (3 coats) and 2 (4 coats), respectively. As shown, the back surface temperatures of the aluminum substrates are maintained below 300° C. fir greater than 30 minutes. For uncoated aluminum samples, the average time to reach 300° C. is about 5 minutes.

TABLE 1

| COATING COMPOSITIONS | | |
|---|---|---|
| Solution | Composition | Layer |
| 47Ai | 50 g. Sodium Silicate 'N'* + 50 g. Kasil 6* + 30 g. Alumina A-16* | Bond/Top |
| 39A | 50 g. Sodium Silicate 'N' + 50 g. Kasil 6 + 12 g. Al (OH)₃ + 6 ml. H₂O | Bond/Top |
| 47Bii | 50 g. Sodium Silicate 'N' + 50 g. Kasil 6 + 5 g. Silicon Carbide powder + 2 g. Silicon Carbide whiskers | Intumescent |
| 47Bw | 50 g. Sodium Silicate 'N' + 50 g. Kasil 6 + 5 g. SiC powder + 2 g. wollastonite | Intumescent |
| 50B | 60 g. Sodium Silicate 'N' + 40 g. Kasil 6 + 5 g. SiC powder | Intumescent |
| 51B | 40 g. Sodium Silicate 'N' + 60 g. Kasil 6 + 5 g. SiC powder | Intumescent |
| 50A | 60 g. Sodium Silicate 'N' + 40 g. Kasil 6 + 12 g. Al (OH)₃ + 6 ml. H₂O | Bond/Top |
| 51A | 40 g. Sodium Silicate 'N' + 60 g. Kasil 6 + 12 g. Al (OH)₃ + 6 ml. H₂O | Bond/Top |

*denotes trademark

EXAMPLES

Example 1

First Coat (Solution 39A)
Second Coat (Solution 47Bii)
Third Coat (Solution 39A)
FIRE TEST RESULT: Time for back surface to reach 300° C.>30 min. Total applied coating thickness: 2.2 mm. (upon heating expands to about 2.5-5 cm).

Example 2

First Coat (Solution 39A)
Second Coat (Solution 47Bii)
Third Coat (Solution 39A)
Fourth Coat (Solution 47Bii)
FIRE TEST RESULT: Time for the back surface to reach 300° C.>30 min. Total applied coating thickness: 3.07 mm. (expands to about 2.5-5 cm upon heating)

Example 3

First Coat (Solution 39A)
Second Coat (Solution 47Bw): 50 g. Sodium SIlicate 'N', 50 g. Potassium Silicate, 5 g. Silicon Carbide powder, 2 g. wollastonite fibers.
Third Coat (Solution 39A)
FIRE TEST RESULT: Time for back surface to reach 300° C.>30 min. Total applied coating thickness: 1.91 mm. (expands to about 2.5-5 cm upon heating)

Example 4

First Coat (Solution 39A)
Second Coat (#3 Vermiculite from W.R. Grace): A thin layer of non-exfoliated vermiculite is spread evenly over the uncured first coat. Technically then it is not a separate coating, but rather a filler.
Third Coat Solution 47Bii)
FIRE TEST RESULT: Time for the back surface to reach 300° C.>30 min. Total applied coating thickness: 1.95 mm. (expands to about 2.5-5 cm upon heating)

Example 5

First Coat (Solution 47Ai)
Second Coat (Solution 47Bii)
Third Coat (Solution 47Ai)
FIRE TEST RESULT: Time for back surface to reach 300° C.>30 min. Total applied coating thickness: 2-4 mm (expands to about 2.5-5 cm upon heating)

Example 6

First Coat (Solution 51A)
Second Coat (Solution 51B)
Third Coat (Solution 51A)

FIRE TEST RESULT: Time for back surface to reach 300° C. >30 min. Total applied coating thickness: 2-4 mm (expands to about 2.5-5 cm upon heating)

Example 7

First Coat (Solution 50A)
Second Coat (Solution 50B)
Third Coat (Solultion 50A) FIRE TEST RESULT: Time for back surface to reach 300° C. >30 min. Total applied coating thickness: 2-4 mm (expands to about 2.5-5 cm upon heating)

In all examples, the amounts of ingredients are expressed as parts by weight to and upon the weight of the composition of each coat. Also, the particle size of SiC powder is in the range of 50-200 micrometers and the size of the SiC whisker/fiber is 50-200 micrometers.

The embodiments of the invention in which an exclusive property of privilege is claimed are defined as follows:

1. A fire-resistant inorganic intumescent coating composition which intumesces when subjected to high temperatures to form a substantially continuous heat insulating structure comprising

|  | Parts by Weight |
| --- | --- |
| Sodium Silicate | 40-70 |
| Potassium Silicate | 40-70 |
| Silicon carbide powder | 03-15 | wherein the amounts of the ingredients are expressed as parts by weight, based upon the weight of the composition.

2. A composition according to claim 1 further comprising silicon carbide whiskers/fibers in an amount of 1-8 parts by weight of the composition.

3. A composition according to claim 2, further comprising borax in an amount of 2-4 parts by weight of the composition.

4. A composition according to claim 1, wherein the silicon carbide powder is of a particle size of 50-200 micrometers.

5. A composition according to claim 2, wherein the silicon carbide powder is of a particle size of 50-200 micrometers and wherein the silicon carbide whiskers are of a size range of 50-200 micrometers.

6. A composition according to claim 2, comprising

|  | Parts by Weight |
| --- | --- |
| Sodium Silicate | 50 |
| Potassium Silicate | 50 |
| Silicon carbide powder (particle size 50-200 micrometers) | 05 |
| Silicon carbide whisker/fibers (size - 50-200 micrometers) | 02 | wherein the amounts of the ingredients are expressed as parts by weight based upon the weight of the composition.

7. A composition according to claim 1, comprising

|  | Parts by Weight |
| --- | --- |
| Sodium Silicate | 60 |
| Potassium Silicate | 40 |
| Silicon carbide powder (particle size 50-200 micrometers) | 05 | wherein the amounts of the ingredients are expressed as parts by weight based upon the weight of the composition.

8. A composition according to claim 1, comprising

|  | Parts by Weight |
| --- | --- |
| Sodium Silicate | 40 |
| Potassium Silicate | 60 |
| Silicon carbide powder (particle size 50-200 micrometers) | 05 |

9. A composite fire-resistant coating composition for fire protection of a substrate, comprising a plurality of coating compositions sequentially applied to the substrate and cured in situ in the following order:
    (a) a heat resistant, substantially air impermeable bonding layer, and
    (b) an inorganic intumescent layer which intumesces when subjected to high temperatures to form a substantially continuous heat insulating structure, wherein layer (b) is of a composition,

|  | Parts by Weight |
| --- | --- |
| Sodium Silicate | 40-70 |
| Potassium Silicate | 40-70 |
| Silicon carbide powder (particle size 50-200 micrometers) | 03-15 | wherein the amounts of the ingredients are expressed as parts by weight based upon the weight of the composition.

10. A composition according to claim 9, further comprising
    (c) a heat resistant topcoat layer.

11. A composition according to claim 10, wherein layer (b) is of a composition,

|  | Parts by Weight |
| --- | --- |
| Sodium Silicate | 40-70 |
| Potassium Silicate | 40-70 |
| Silicon carbide powder (particle size 50-200 micrometers) | 03-15 |
| Silicon carbide whiskers/fibers (size 50-200 micrometers) | 01-08 | wherein the amounts of the ingredients are expressed as parts by weight based upon the weight of the composition.

12. A composition according to claim 9, wherein layer (a) is of a composition,

|  | Parts by Weight |
| --- | --- |
| Sodium Silicate | 40-60 |
| Potassium Silicate | 40-60 |
| Refractory filler | 10-30 | wherein the amounts of the ingredients are expressed as parts by weight based upon the weight of the composition.

13. A composition according to claim 12, wherein layer (c) is of the same composition as layer (a).

14. A composition according to claim 13, wherein the refractory filler is aluminum trihydrate.

15. A composition according to claim 14, further comprising (d) an inorganic intumescent layer which intumesces when subject to high temperatures to form a substantially continuous heat insulating structure.

16. A composition according to claim 15, wherein layer (d) is of the same composition as layer (b).

17. A composition according to claim 11, wherein layer (c) is of a composition,

|  | Parts by Weight |
| --- | --- |
| Sodium Silicate | 40–60 |
| Potassium Silicate | 40–60 |
| Aluminum trihydrate | 10–30 |
| Silicon carbide whiskers/fibers (size 50–200 micrometers) | 01–08 | wherein the amounts of the ingredients are expressed as parts by weight based upon the weight of the composition.

18. A composition according to claim 10, wherein layer (a) is of a composition,

|  | Parts by Weight |
| --- | --- |
| Sodium Silicate | 40–60 |
| Potassium Silicate | 40–60 |
| Aluminum trihydrate | 10–30 |
| Water | 00–10 | and wherein layer (b) is of a composition,

|  | Parts by Weight |
| --- | --- |
| Sodium Silicate | 40–70 |
| Potassium Silicate | 40–70 |
| Silicon carbide powder (particle size - 50–200 micrometers) | 03–15 |
| Silicon carbide whiskers/fibers (size - 50–200 micrometers) | 00–08 | and wherein layer (c) is of a composition,

|  | Parts by Weight |
| --- | --- |
| Sodium Silicate | 40–60 |
| Potassium Silicate | 40–60 |
| Aluminum trihydrate | 10–30 |
| Water | 00–10 | wherein the amounts of the ingredients (in each layer) are expressed as parts by weight based upon the weight of the composition (of each layer).

19. A composition according to claim 18, wherein layer (a) is of a composition,

|  | Parts by Weight |
| --- | --- |
| Sodium Silicate | 50 |
| Potassium Silicate | 50 |
| Aluminum trihydrate | 30 | and wherein layer (b) is of a composition,

|  | Parts by Weight |
| --- | --- |
| Sodium Silicate | 50 |
| Potassium Silicate | 50 |
| Silicon carbide powder (particle size - 50–200 micrometers) | 05 |
| Silicon carbide whiskers/fibers (size - 50–200 micrometers) | 02 | and wherein layer (c) is of a composition,

|  | Parts by Weight |
| --- | --- |
| Sodium Silicate | 50 |
| Potassium Silicate | 50 |
| Aluminum trihydrate | 30 | where the amounts of the ingredients (in each layer) are expressed as parts by weight based upon the weight of the composition (of each layer).

20. A composition according the claim 18, wherein layer (a) is of a composition,

|  | Parts by Weight |
| --- | --- |
| Sodium Silicate | 50 |
| Potassium Silicate | 50 |
| Aluminum trihydrate | 12 |
| Water | 06 | and wherein layer (b) is of a composition,

|  | Parts by Weight |
| --- | --- |
| Sodium Silicate | 50 |
| Potassium Silicate | 50 |
| Silicon carbide powder (particle size - 50–200 micrometers) | 05 |
| Silicon carbide whiskers/fibers (size - 50–200 micrometers) | 02 | and wherein layer (c) is of a composition,

|  | Parts by Weight |
| --- | --- |
| Sodium Silicate | 50 |
| Potassium Silicate | 50 |
| Aluminum trihydrate | 12 |
| Water | 06 | wherein the amounts of the ingredients (in each layer) are expressed as parts by weight based upon the weight of the composition (of each layer).

21. A composition according to claim 18, wherein layer (a) is of a composition,

|  | Parts by Weight |
| --- | --- |
| Sodium Silicate | 60 |
| Potassium Silicate | 40 |
| Aluminum trihydrate | 12 |
| Water | 06 | and wherein layer (b) is of a composition,

|  | Parts by Weight |
| --- | --- |
| Sodium Silicate | 60 |
| Potassium Silicate | 40 |
| Silicon carbide powder (particle size - 50–200 micrometers) | 05 | and wherein layer (c) is of a composition,

|  | Parts by Weight |
| --- | --- |
| Sodium Silicate | 60 |
| Potassium Silicate | 40 |
| Aluminum trihydrate | 12 |

| | Parts by Weight |
|---|---|
| Water | 12 | where the amounts of the ingredients (in each layer) are expressed as parts by weight based upon the weight of the composition (of each layer).

22. A composition according to claim 18, wherein layer (a) is of a composition,

| | Parts by Weight |
|---|---|
| Sodium Silicate | 40 |
| Potassium Silicate | 60 |
| Aluminum trihydrate | 12 |
| Water | 06 | and wherein layer (b) is of a composition,

| | Parts by Weight |
|---|---|
| Sodium Silicate | 40 |
| Potassium Silicate | 60 |
| Silicon carbide powder | 05 |
| (particle size - 50-200 micrometers) | | and wherein layer (c) is of a composition,

| | Parts by Weight |
|---|---|
| Sodium Silicate | 40 |
| Potassium Silicate | 60 |
| Aluminum trihydrate | 12 |
| Water | 06 | wherein the amounts of the ingredients (in each layer) are expressed as parts by weight based upon the weight of the composition (of each layer).

23. A composition according to claim 10, wherein layer (a) is of a composition,

| | Parts by Weight |
|---|---|
| Sodium Silicate | 50 |
| Potassium silicate | 50 |
| Aluminum trihydrate | 12 |
| Water | 06 | and wherein layer (b) is of a composition,

| | Parts by Weight |
|---|---|
| Sodium Silicate | 50 |
| Potassium Silicate | 50 |
| Silicon carbide powder | 05 |
| Wollastonite fiber | 02 | and wherein layer (c) is of a composition,

| | Parts by Weight |
|---|---|
| Sodium Silicate | 50 |
| Potassium Silicate | 50 |
| Aluminum trihydrate | 12 |
| Water | 06 |

24. A composition according to claim 10, further comprising
   (d) an inorganic intumescent layer which intumesces when subjected to high temperatures to form a continuous heat insulating structure.

25. A composition according to claim 24, wherein layer (d) is of the same composition as layer (b).

26. A composition according to claim 25, wherein layers (a) and (c) are of a composition,

| | Parts by Weight |
|---|---|
| Sodium Silicate | 50 |
| Potassium Silicate | 50 |
| Aluminum trihydrate | 12 |
| Water | 06 | and wherein layers (b) and (d) are of a composition, and wherein layers (b) and (d) are of a composition

| | Parts by Weight |
|---|---|
| Sodium Silicate | 50 |
| Potassium Silicate | 50 |
| Silicon carbide powder | 05 |
| Silicon carbide whisker | 02 |

27. An article of manufacture comprising a substrate coated with a fire-resistant coating system according to claim 10.

28. An article of manufacture according to claim 27, wherein the substrate is an aluminum substrate.

* * * * *